Nov. 8, 1932.  P. DIETZEL  1,887,121
SLIDE GUIDE FOR THE FINE ADJUSTMENT OF MICROSCOPES
Filed Dec. 26, 1929
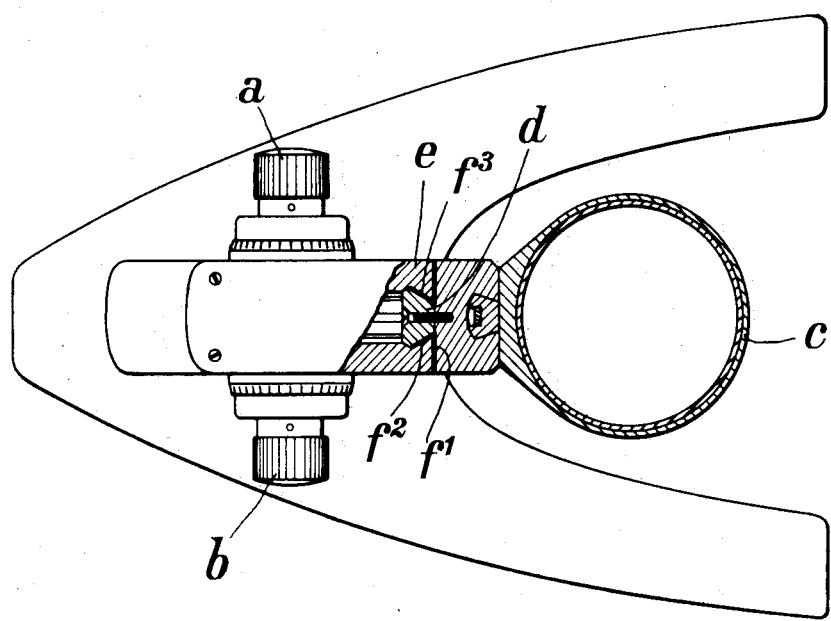
Inventor:
Paul Dietzel Patented Nov. 8, 1932

1,887,121

UNITED STATES PATENT OFFICE

PAUL DIETZEL, OF JENA, GERMANY, ASSIGNOR TO THE FIRM OF CARL ZEISS, OF JENA, GERMANY

SLIDE GUIDE FOR THE FINE ADJUSTMENT OF MICROSCOPES

Application filed December 26, 1929, Serial No. 416,633, and in Germany February 21, 1929.

Slide guides for the fine adjustment of microscopes are required to meet especially high exigencies with respect to uniformity of movement at different positions and invariability of this movement. Hitherto it generally was tried to fulfill these requirements by accurately adapting the guiding surfaces to each other and by carefully greasing them.

Quite surprisingly it proved however that these requirements can be met more effectively than hitherto in a simple manner when, according to the invention, of the two guiding surfaces sliding upon one another at least one is chromium plated. Not only is in such case the mutual friction of the guiding surfaces greatly reduced but the exacting work of the guides is less liable to unfavourable atmospheric conditions.

The accompanying drawing represents by way of example, and partially in a section, a diagram of a microscope stand which is provided with a slide guide corresponding to the invention.

The stand supports a fine adjustment for the tube $c$, which is operated by means of two milled heads, $a$ and $b$, and has its movable part provided with a dove-tailed slide $d$ displaceable in a corresponding guide of the fixed part $e$. Of the pairs of surfaces belonging to the guide and slide and sliding upon one another, viz. $f^1$, $f^2$ and $f^3$, (represented by bold lines in the drawing), those belonging to the movable part are chromium plated.

I claim:

Slide guide for the fine adjustment of microscopes, comprising two systems of guiding surfaces that slide upon one another, of two surfaces sliding upon one another at least one being chromium plated.

PAUL DIETZEL.